United States Patent Office 3,434,847
Patented Mar. 25, 1969

3,434,847
METHOD OF MAKING BUTTERCREAM CANDY
Claude D. Barnett, Cedarhurst, N.Y., assignor to Calico Cottage Candies, Inc., Hewlett, N.Y., a corporation of New York
No Drawing. Filed July 21, 1965, Ser. No. 473,844
Int. Cl. A23g 3/00
U.S. Cl. 99—134                                                                1 Claim

ABSTRACT OF THE DISCLOSURE

Method of making buttercream candy from a dehydrated dry mix of confectionery ingredients by adding to the dry mix water to provide a moisture content of between 8 and 30 percent water by weight. The water and dry mix are mixed at a temperature of less than 180° F., and the mixture is then permitted to harden.

---

This invention relates to a method of making candy.

A standard method of making candy involves the following general sequence of steps, (1) take a general or approximate amount of water sufficient to dissolve the desired amount of sugar, (2) dissolve the sugar in the water, (3) add other candy ingredients in liquid form, i.e., corn syrup, to the sugar-water mixture, (4) remove excess water by boiling to a specific temperature or boiling in a vacuum chamber for a specified period of time, and (5) a step of beating, mixing or fluffing the candy. Subsequent to these steps, the candy is then permitted to harden.

The above sequence of steps has an inherent disadvantage resulting from the manner in which water is utilized as an ingredient and then driving excess water off. Thus, the above standard method of making candy does not adapt itself for use in connection with modern business methods whereby the present invention has a very distinct advantage. Also, the standard method of making candy takes longer than the present method and inherently does not result in uniformity of water content.

In accordance with the present method of making candy, most of the ingredients are prepackaged in a dehydrated dry mix so that they may be shipped to various stores of a chain store organization. As a result thereof, the shipping charges are substantially lower and candy may be manufactured at the desired rate by any particular store of the chain store organization. The fundamental concept of the present invention relies in a reversal of the method steps which are considered standard in the industry. That is, the present invention noly involves adding water to the dehydrated dry mix whereas the standard methods subtract water from the mix by boiling. Thus, the present invention starts out with a pre-measured amount of water and therefore does not require any secondary steps to drive off excess water.

In accordance with the present invention, there is first prepared a dehydrated dry mix of sugar, dried corn syrup, gelatin, powdered cream, sorbitol, dextrose, cocoa, chocolate, or brown sugar in the desired combination required to prepare a particular type of candy. Thereafter, a specific measured amount of heated water is added to a specific amount of the mix to get a specific moisture content of between 8 and 30% by weight. The temperature of the water should be such that the temperature of the mixture is below 180° F. when gelatin is an ingredient. Thereafter, the mix may be aerated by beating or the like depending upon the nature of the candy.

It is an object of the present invention to provide a novel method of making candy.

It is another object of the present invention to provide a novel method of making candy which reverses the standard process in connection with how water is added to the ingredients.

It is another object of the present invention to provide a method of making candy which does not require boiling off or otherwise driving off excess water.

It is another object of the present invention to provide a method of making candy which lends itself for use with modern chain store merchandising practices.

Other objects will appear hereinafter.

In accordance with the present invention, the major ingredients of any particular candy are prepared as a dehydrated dry mix. The dry mix has almost indefinite shelf life and is light in weight so that it may be readily shipped to distant locations. When it is desired to make a batch of a particular type of candy, the particular dry mix is removed from its container and added to a specific amount of water necessary to provide a moisture content of between 8 and 30% by weight. This may be readily facilitating by using a particular size container for the dry mix. For example, the dry mix for one batch of one type of candy may weigh three pounds whereas the dry mix for another type of candy may weigh five pounds.

The mixture of water and the dry mix ingredients will then be heated to a temperature of less than about 180° F. if gelatin is one ingredient. The dry mix may be added gradually in stages and any additional flavoring may be added as desired. Thereafter, the candy will be permitted to set and harden if no aerating is required such as with a marshmallow candy.

The method of the present invention may be more clearly illustrated in connection with the following examples.

EXAMPLE 1

This example relates to the procedure for making butter creams. The dehydrated powdered mix was a container having 5¾ pounds of Nulofond (or equivalent such as Drifond) and ten grams of salt. Nulofond is a brand name for 90% sucrose, 3% moisture and 7% invert sugar sold commercially by the Sucrest Sugar Refining Corporation of New York, N.Y. To eight ounces of warm water such as 60° F. to 140° F., there is added approximately one-half of the dry mix and the same is mixed for approximately three minutes. Thereafter, a teaspoon of vanilla, one-half pound of dairy butter, and one-quarter teaspoon of invertase is added. Thereafter, the mixture is mixed for an additional three minutes and two scoops of frappé were added using a No. 20 ice cream scoop. The balance of the dry mix is then gradually added. Thereafter, the candy may be spread out on a smooth surface or rolled into shapes and permitted to stand until firm enough to dip. These steps require a total of about eight minutes. A standard method of making butter cream candy would require about thirty minutes.

EXAMPLE 2

The method of Example 1 was repeated with the following change. The dry mix included 4 ounces of powdered coffee flavoring so that the candy was coffee flavored buttercreams.

EXAMPLE 3

The method of Example 1 was repeated with the following change. The dry mix included 8 ounces of powdered cocoa so that the candy was chocolate flavored buttercreams.

EXAMPLE 4

The method of Example 1 was repeated with the following change. The dry mix included 3 teaspoons of powdered orange flavor and one-half teaspoon powdered orange coloring so that the candy was orange flavored buttercreams.

EXAMPLE 5

The method of Example 1 was repeated with the following change. The dry mix included 1 teaspoon powdered raspberry flavor and one-half teaspoon red coloring so that the candy was raspberry flavored buttercreams.

EXAMPLE 6

This example relates to a method for making marshmallow. A bag of marshmallow mix having a weight of about 3½ to 3¾ pounds will have been prepared. Such mix includes 38% sugar by weight, ½ to 5% quick dissolving gelatin powder by weight, and the balance of dry powdered corn syrup.

The mix is added in its entirety to 24 ounces of heated water so that the mixture has a resultant temperature of approximately 180° F. or less. When the mix is completely dissolved, the mixture is poured into a mixing bowl and beaten so as to aerate the same. After the beating operation of approximately 8 minutes, the marshmallow is ready for pouring onto a board lined with kraft paper and permitted to harden. The entire method requires from one-third to one-fourth the time required by standard methods which involve dissolving gelatin in water, dissolving sugar in water, dissolving the two mixtures, then adding liquid corn syrup, and then beating.

EXAMPLE 7

The method of Example 6 was repeated. During the beating operation, a paste-like mixture of 2 ounces of powdered coffee flavoring and 2 tablespoons of water was added. This produced a coffee flavored marshmallow candy.

EXAMPLE 8

The method of Example 6 was repeated. After about 6 minutes, the beating step was stopped. Three teaspoons of raspberry flavor, 2 tablespoons of lemon juice and one-half teaspoon of red color were added. The beating step was then started again and continued for about one minute. This produced raspberry flavored marshmallow candy.

EXAMPLE 9

The method of Example 6 was repeated. After about 7 minutes, the beating step was stopped. One-half teaspoon of peppermint and 1 teaspoon of green color were added. Thereafter, the beating step was resumed for about one-half minute. This produced mint flavored marshmallow candy.

EXAMPLE 10

The method of Example 6 was repeated. After about 6 minutes, the beating step was stopped. Two teaspoons of maple flavor were added. The beating step was then resumed for about one minute. After pouring of the candy and smoothing with a palette knife, pecans were sprinkled on top of the candy. A sheet of silicone paper was placed over the pecans to facilitate pressing them into the candy. This produced maple pecan marshmallow candy.

In connection with each of the examples set forth above, the prepared dry mix has a shelf life which is almost indefinite whereas candy has a very limited shelf life and will become stale. Hence, candy can be made as it is needed. In addition, the above procedures substantially, that is at least 50%, reduce the time necessary to make the same amount of candy by the above methods as compared with standard methods. At the location where the candy is being made, generally the only liquid available is water and this is all that is required. Hence, the present invention does not require the necessity of shipping in commerce liquids which are heavy and bulky and subject to breakage.

The present invention may be embodied in other specific forms without departing from the spirit or essential attributes thereof and, accordingly, reference should be made to the appended claim, rather than to the foregoing specification as indicating the scope of the invention.

I claim:
1. A method of making buttercream candy comprising the steps of providing a dehydrated dry buttercream mix of confectionery ingredients, adding approximately one-half the quantity of the thusly provided dry mix to a measured quantity of heated water, mixing the dry mix in water for approximately three minutes, thereafter adding the balance of the dry mix to provide a final moisture content of the dry mix and measured quantity of water of between eight and thirty percent water by weight, thereafter continuing mixing the water and dry mix at a temperature of less than 180° F. whereby to form the desired candy in a total time of approximately eight minutes, and then permitting the mixture to harden.

References Cited
UNITED STATES PATENTS

| | | | |
|---|---|---|---|
| 2,651,574 | 9/1953 | Whittier | 99—134 |
| 2,949,367 | 8/1960 | Goldmeier | 99—134 |
| 3,018,183 | 1/1962 | Downey | 99—134 |

RAYMOND N. JONES, *Primary Examiner.*